US012465279B1

United States Patent
Arool Emmanuel et al.

(10) Patent No.: US 12,465,279 B1
(45) Date of Patent: Nov. 11, 2025

(54) SYSTEMS FOR DETERMINING USER-SPECIFIC ULTRAVIOLET LIGHT EXPOSURE DATA

(71) Applicant: AMAZON TECHNOLOGIES, INC., Seattle, WA (US)

(72) Inventors: Cyril Arokiaraj Arool Emmanuel, San Jose, CA (US); Haithem Albadawi, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 601 days.

(21) Appl. No.: 17/936,463

(22) Filed: Sep. 29, 2022

(51) Int. Cl.
  *G01J 1/42* (2006.01)
  *A61B 5/00* (2006.01)
  *G01L 19/00* (2006.01)
  *A61B 5/024* (2006.01)

(52) U.S. Cl.
  CPC ............ *A61B 5/441* (2013.01); *G01J 1/4204* (2013.01); *G01L 19/0092* (2013.01); *A61B 5/02416* (2013.01); *A61B 2560/0252* (2013.01); *A61B 2560/0257* (2013.01)

(58) Field of Classification Search
  CPC ............... A61B 5/441; A61B 5/02416; A61B 2560/0252; A61B 2560/0257; G01J 1/4204; G01L 19/0092
  See application file for complete search history.

(56) References Cited

U.S. PATENT DOCUMENTS

2014/0374600 A1* 12/2014 Gokingco ............... G01J 1/16
  250/340
2018/0017437 A1* 1/2018 Poutiatine ............ G01J 1/0228

\* cited by examiner

*Primary Examiner* — David P Porta
*Assistant Examiner* — Mamadou Faye
(74) *Attorney, Agent, or Firm* — Lindauer Law, PLLC

(57) ABSTRACT

A wearable device detects ambient ultraviolet light and provides output related to lengths of time for safe exposure and health benefits. Orientations of the device, determined by an orientation sensor, intensity of ambient light determined by ultraviolet and visible light sensors, or both are used to determine a current position of the sun or other source of ultraviolet light. Data from the sensors and position of the sun are used to select a gain level for the ultraviolet light sensor or a corrective factor to be applied to signals from the ultraviolet light sensor. At a subsequent time, detected intensity of ambient ultraviolet light may be used in combination with external data relating to the location of the device to determine an output, such as recommended times for exposure. Other sensors may determine physiological characteristics of the user, which may also be used to determine personalized recommended exposure times.

20 Claims, 5 Drawing Sheets

SYSTEMS FOR DETERMINING USER-SPECIFIC ULTRAVIOLET LIGHT EXPOSURE DATA

BACKGROUND

Exposure to ultraviolet light, from the sun or other sources, may have both positive and negative effects on the health of an individual. The lengths of time and the specific times of day that are optimal for sun exposure, by reducing the likelihood of negative effects and increasing the likelihood of positive effects, may vary depending on the specific location of an individual, the angle and position of the sun relative to that location, characteristics of the location such as weather, and characteristics of the individual such as skin characteristics.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
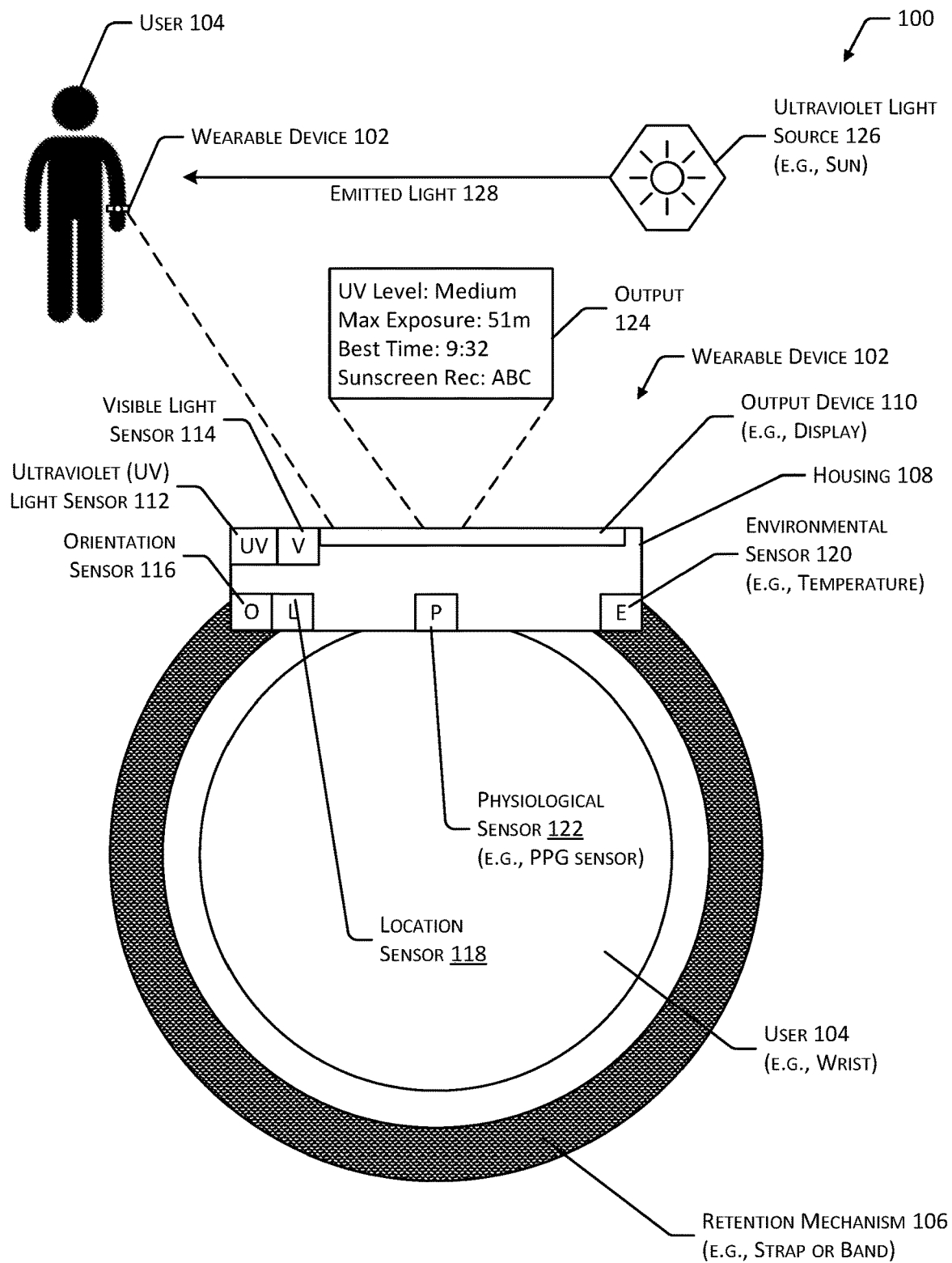
FIG. 1 is a diagram depicting an implementation of a wearable device for detecting ultraviolet light.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Ultraviolet (UV) light includes light having a wavelength ranging from 100 nanometers (nm) to 400 nm, while visible light includes light typically having a wavelength ranging from 400 nm to 700 nm. UV light is subdivided into three bands: UV-A having a wavelength ranging from 315 nm to 400 nm, UV-B having a wavelength ranging from 280 to 315 nm, and UV-C having a wavelength ranging from 100 to 280 nm. The sun emits both visible light and UV light toward the Earth, and the emitted light is affected differently by the Earth's atmosphere and by the skin of individuals exposed to the light depending on the wavelength of the light. For example, most UV-A light is generally unaffected by passage through the atmosphere and also penetrates through the epidermal layer of most human skin to affect the dermis of the skin. The majority of UV-B light emitted by the sun is absorbed by ozone, water vapor, oxygen, and carbon dioxide in the atmosphere, such that only a small portion of UV-B light reaches the Earth's surface. UV-B light is typically absorbed or reflected by the epidermal layer of human skin. Substantially all of the UV-C light emitted by the sun is absorbed by Earth's atmosphere. The intensities of different bands of UV light that reach the Earth and the possible effect of exposure on humans may vary in different locations (e.g., different latitudes and longitudes, and different elevations), and may also vary based on time of year, or atmospheric conditions such as the amount of ozone or carbon dioxide present above a location.

In addition to the location-specific and environmental conditions described above, the effects of UV light on a human may vary depending on characteristics of the human, such as skin characteristics. For example, different amounts of fat, fluids, or pigments, amounts of hair growth, thickness of various layers of the skin, the total exposed surface area of a human, and so forth may affect the amount of UV light that is reflected or absorbed by the body. Continuing the example, the height and weight of a human may affect the surface area of the human that is exposed to sunlight, affecting the amount of radiant exposure that is experienced. Additionally, characteristics of a human's skin may change with age, diet, exercise, health conditions, and so forth.

Exposure to unsafe amounts of UV light may have negative effects on human health, such as certain types of cancer, the appearance of premature aging and skin damage, cataracts and other types of damage to the eye, and suppression of the immune system. Exposure to certain wavelengths of light, such as UV-B light, may also have positive effects on human health, such as facilitating the synthesis of Vitamin-D (calciferol) by the body. Deficiencies in Vitamin-D are also associated with negative effects on human health, and exposure to at least some level of UV light may reduce the likelihood of one or more negative health effects.

Existing monitoring systems, such as those associated with governmental agencies, may provide information regarding UV light, weather conditions, and atmospheric conditions at various locations. However, these systems monitor a limited number of locations, and the UV light present at other locations may vary significantly from the closet location for which information is available. Existing UV light sensors that may be worn or carried by individuals are subject to inaccuracy due to frequent changes in the location and orientation of the sensor relative to the sun.

Described in this disclosure are techniques for calibrating one or more UV light sensors of a wearable device to enable accurate determination of intensity of UV light in an environment associated with a user, for providing a customized recommendation based on environmental or physiological factors associated with the user. The UV light sensor(s) may be calibrated by determining intensities of ambient light and other characteristics of a current location of the wearable device. Based on these characteristics, a corrective factor that may be applied to a detected intensity of UV light maybe used to determine a value associated with radiant exposure. In one implementation, the UV light sensor may be calibrated by selecting a gain level for the UV light sensor based on the determined position of the sun, detected UV light, and the current orientation of the device relative to the position of the sun. In other implementations, a signal from the UV light sensor may be modified using a corrective factor as part of a post-processing operation. UV light detected using the calibrated sensor may be used in combination with other information from external sources based on the current location of the device. For example, weather information, almanac information, or other similar types of information may be used to determine an expected position of the sun at a selected time, an expected intensity of UV light, and so forth. The detected intensity of UV light and other information may be used to determine an amount of radiant exposure (e.g., based on the surface area of the UV light sensor) and an output, such as recommended times or lengths of time for safe exposure to the sun, or other sources of UV light. In some implementations, the output may be determined based in part on data from one or more physiological sensors. For example, a photoplethysmograph (PPG) sensor may be used to emit light toward the skin of a user and determine data indicative of the absorption or reflection of the emitted light, which may in turn be used to determine a suitable length of time for exposure to an ultraviolet source. As another example, user input indicating a height and weight of a user may be received, and the surface area of the body may be calculated and used to determine radiant exposure based on the intensity of the detected UV light. As a result, an output that is presented may be personalized based on characteristics of the user.

During a first time period, the UV light sensor of the device may be calibrated by determining a corrective factor based on signals from one or more sensors of the device. For example, user input may execute an application, activate the UV light sensor, or otherwise cause the UV sensor of the device to begin acquiring data. In some implementations, the intensity of light detected by one or more of the UV light sensor or a visible light sensor may be compared to a threshold value indicative of an outdoor environment to determine that the device is currently outdoors before calibrating the UV light sensor. In other implementations, one or more other sensors of the device, such as a temperature sensor, may be used to determine data indicative of an environmental condition to determine that a user is outdoors. For example, a temperature sensor may be used to determine an ambient temperature, which may be compared to a threshold value indicative of an expected temperature for the current location of the device and current time of year. As another example, a barometer or other type of pressure sensor may be used to determine ambient air pressure, which may be compared to a threshold value indicative of an expected pressure for the current location of the device and current time of year. An output device, such as a display or speaker, may then be used to present an instruction to position the device at one or more positions or orientations. For example, a user may be instructed to move or rotate the device. While the device is moved by the user, one or more of the UV light sensor, visible light sensor, an orientation sensor, or a location sensor may be used to acquire data. For example, for one or more positions of the device, a current orientation of the device, an intensity or radiant exposure (e.g., intensity per unit of area) of detected UV light in one or more bands, and of detected visible light, may be determined. The intensities or radiant exposure of detected light, for multiple orientations and positions, may be used to determine a current position of the sun (e.g., distance, direction, inclement angle) relative to the current location of the device. The determined position of the sun and the intensity of detected UV light may then be used to determine a gain level or other type of configuration for the UV sensor that may cause detected intensities of UV light to be within a threshold range of values (e.g., above a threshold minimum value and below a threshold maximum value) associated with the UV sensor. In other implementations, a user may be provided with an instruction to orient the device toward the sun or other ultraviolet source, which may enable an expected maximum (e.g., peak) value for light detected by the UV sensor to be determined. The corrective factor to calibrate the UV sensor may then be determined based on this value independent of the orientation of the device.

At subsequent times, the process for determining a corrective factor, such as a gain level for the UV sensor or a post-processing modifier for signals determined using the UV sensor (e.g., "calibrating" the UV sensor) may be repeated. In some implementations, this process may be performed automatically, without providing an instruction to the user. For example, as the user moves and performs activities, the location, orientation, and detected intensities of light may be determined automatically and used to determine the position of the sun relative to the device, and a gain level or other corrective factor for use with the UV sensor. In some implementations, this process may be performed in response to movement of the device at least a threshold distance from a current location, passage of at least a threshold length of time, or detection of an intensity of UV light that is outside the threshold range of values associated with the UV sensor. Periodic or continuous determination of a gain level or other configuration or corrective factor for use with the UV sensor may enable the device to accurately detect an intensity of UV light at the current location of the device independent of the position or orientation of the device, or environmental conditions associated with the current location.

After a corrective factor for the UV sensor has been determined, a current orientation of the device and current intensity of detected UV light may be used to determine output data. In other implementations, the expected maximum (e.g., peak) value for detected UV light may be used in combination with the current intensity of detected UV light to determine the output data, independent of the orientation of the device. For example, output data may include a length of time associated with safe exposure to light from the sun or other ultraviolet source. If a surface area of a user of the device is able to be determined, such as through user input indicating a height and weight, the intensity of detected UV light may be used to determine an amount of radiant exposure to which the user is subjected. In some implementations, location data indicative of a location of the device may be determined using a location sensor, and provided to an external computing device, such as a server or other type of computing device associated with weather or environmental information for the current location, almanac information for the location, and so forth. This information may be used in combination with the detected intensity of UV light to determine the output data. In some implementations, if a difference between the detected intensity of UV light and the information determined based on the location of the device exceeds a threshold difference, this may indicate a possible inaccuracy in the detected UV light and the process described above for determining a gain level or other corrective factor for the UV sensor may be repeated.

In some implementations, the output data may be determined at least in part based on data from one or more physiological sensors. For example, data from a PPG sensor may indicate absorption or reflection of the emitted light by the user's skin. Data from the PPG sensor may be indicative of skin elasticity, amounts of fat, hair, pigment, fluid, or other components of the skin. As another example, a height and weight of a user may be used to determine a surface area of the user that is exposed to UV light, which may in turn affect a length of time associated with safe exposure, a length of time associated with health benefits such as Vitamin D synthesis, and so forth.

Implementations described herein enable a corrective factor for use with a UV light sensor of a device to be determined, periodically or continuously, to accurately detect intensities of UV light in a current location of the device. Output based on this information, such as optimal times or lengths of time of exposure to the sun or other ultraviolet source to reduce the likelihood of negative health effects and increase the likelihood of health benefits may then be presented to a user. Presented outputs may include other recommended actions, such as types and times for use of sunscreen or other skin protectants, clothing or dietary recommendations, hydration recommendations, activity recommendations, and so forth. For example, during particular times of day, refraining from aquatic activities due to a large amount of UV light reflected by water may be recommended, while during other times of day, longer periods of exposure for optimal Vitamin D synthesis may be recommended. Recommendations that are presented may be customized to the individual circumstances associated with a user. For example, physiological data such as data indicative of skin characteristics of the user, height and weight that may be used to determine an exposed surface area of the user, and data indicative of conditions at a current location of the user may cause output that is presented to a particular use to differ from output presented to other users.

FIG. 1 is a diagram 100 depicting an implementation of a wearable device 102 for detecting ultraviolet (UV) light. The wearable device 102 is shown having the form factor of a watch, bracelet, or type of worn article that is able to be secured to the wrist or forearm of a user 104 using a retention mechanism 106, such as a band or strap. However, in other implementations, the wearable device 102 may be configured to be worn on other parts of the body, attached to an article of clothing, held or carried by a user 104, and so forth. For example, the wearable device 102 may have a form factor of sunglasses and be worn on the head of the user 104. As the user 104 moves and performs various activities, the location and orientation of the wearable device 102 may change frequently, which may affect the UV light that is detected.

The wearable device 102 may include a housing 108 that encloses various components, such as processors, power sources, circuitry, sensors, and so forth. The wearable device 102 may also include one or more output devices 110 for presenting output 124 to a user 104 of the wearable device 102, such as information associated with detected UV light, recommended times or lengths of time for exposure, recommendations regarding sunscreen or skin protectant, and so forth. For example, an output device 110 may include a display positioned on an exterior surface of the housing 108. As another example, output devices 110 may include one or more speakers, haptic devices, and so forth. While FIG. 1 depicts the wearable device 102 including a single display, any number and any type of output device 110 may be used. Additionally, the wearable device 102 may include one or more input devices. For example, the output device 110 may include a touchscreen display, and a touch sensor associated with the display may function as an input device. As other examples, the wearable device 102 may include one or more microphones, buttons or switches, and so forth. Any number and any type of input device may be incorporated within the wearable device 110.

As shown in FIG. 1, the wearable device 102 may include various types of sensors within the housing 108. For example, an ultraviolet (UV) light sensor 112 may be positioned at a location on or within the housing that is exposed to sunlight, or other light from one or more sources external to the housing 108. The UV light sensor 112 may be configured to detect intensities of light within the ultraviolet spectrum, such as light having wavelengths ranging from 100 nm to 400 nm. A visible light sensor 114 may also be positioned at a location on or within the housing 108 that is exposed to light. The visible light sensor 114 may be configured to detect intensities of light within the visible range of wavelengths, such as light having wavelengths ranging from 400 nm to 700 nm. While FIG. 1 depicts the wearable device 102 including a single UV light sensor 112 and a single visible light sensor 114, in other implementations, the wearable device may include multiple UV light sensors 112 or visible light sensors 114. Additionally, while FIG. 1 depicts the UV light sensor 112 and visible light sensor 114 as separate components, in some implementations, a single light sensor may detect both UV light and visible light. In one implementation, the UV light sensor 112 and visible light sensor 114 may include an array of sensors. The UV light sensor 112 and visible light sensor 114 may be configurable, such as by adjusting a gain level of the sensor(s), which may affect the magnitude of a signal or other type of measurement output by the sensor(s) based on the intensity of light that is detected by the sensor(s). For example, a high gain level may enable the UV light sensor 112 to output a signal that exceeds a threshold minimum value in response to low amounts of detected UV light, while a low gain level may enable the UV light sensor 112 to output a signal that does not exceed a threshold maximum value in response to a high intensity of detected UV light. In other implementations, the UV light sensor 112 may be configurable by using a corrective factor to modify a signal acquired using the UV light sensor 112, such as during a post-processing operation for the signal. For example, a Kalman filter may be used to determine an estimated UV index value (V) based on a predicted value (P) determined based on data associated with the current location of the wearable device 102, a previously-determined maximal value using the UV light sensor 112, or data determined using other sensors of the wearable device 102, a determined corrective factor (F), and a current value (C) determined using the UV light sensor 112, based on Equation 1 below:

$$V=P+F*(C-P) \qquad \text{(Equation 1)}$$

Using a Kalman filter, the predicted value (P) may be determined at a time when the wearable device 102 is exposed directly to light from an ultraviolet light source 126. However, as signals from the UV light sensor 112 change over time, such as due to changes in time, environmental conditions, and location, data from other sensors such as a location sensor 118, environmental sensor 120, and so forth may be used to determine possible changes in the position or angle of the UV light sensor 112, and the corrective factor (F) may be adjusted based on measurements from other sensors at a particular instant in time. For example, a corrective factor of 1 may indicate a high confidence in the current measurement of the UV light sensor 112, while a corrective factor of 0 may indicate a low confidence.

In some implementations, the wearable device 102 may also include an orientation sensor 116 within the housing 108. For example, the orientation sensor 116 may include a gyroscope, magnetometer, or other type of device that may determine an orientation of the wearable device 102 relative to vertical or to the Earth's surface. The determined orientation of the wearable device 102 may be used to determine an intensity of UV light in a location of the wearable device 102. For example, if the wearable device 102 is positioned at the side of the user 104, the orientation of the wearable device 102 may prevent the wearable device 102 from exposure to a large amount of direct sunlight. However, if the wearable device 102 is oriented such that the UV light sensor 112 and visible light sensor 114 face upward, such as when the output device 110 is viewed by the user 104, this may expose the wearable device 102 to a larger amount of direct sunlight. In some implementations, the wearable device 102 may include an accelerometer or other type of motion or position sensor, in addition to or in place of the orientation sensor 116.

The wearable device 102 may additionally include a location sensor 118. In some implementations, the location sensor may include a Global Positioning System (GPS) receiver, which may determine information indicative of a current location of the wearable device 102. For example, data from the location sensor 118 may include a coordinate location (e.g., longitude and latitude). In other cases, data from the location sensor 118 may indicate an address, city, state, country, and so forth. In some implementations, the wearable device 102 may also include an altimeter. For example, different amounts of UV light may reach the Earth's surface at a particular location based in part on the altitude of the location.

The wearable device 102 may also include an environmental sensor 120. For example, environmental sensors 120 may include temperature sensors (e.g., thermometers), which may be used to determine whether the wearable device 102 is in an outdoor environment, changes in weather or time, changes in location, and so forth. As other examples, environmental sensors 120 may include sensors for determining air quality, wind, humidity, air pressure, and so forth.

The wearable device 102 may additionally include one or more physiological sensors 122. As one example, a physiological sensor 122 may include a photoplethysmograph (PPG) sensor. A PPG sensor may emit light toward the skin of the user 104 and determine data indicative of the absorption or reflection of the emitted light 128. In some cases, the light emitted by the PPG sensor may include generally constant light as contrasted to light that changes in intensity. For example, during use acquiring signals indicative of blood perfusion, the light emitted by a PPG sensor may change. However, when acquiring signals indicative of skin characteristics of a user, the light emitted by the PPG sensor may remain generally constant. Skin characteristics of the user 104 may include elasticity, amounts of fat, fluid, or pigment, and so forth, which may in turn be used to determine a suitable length of time for exposure to an ultraviolet source. As other examples, physiological sensors 122 may determine a body temperature of the user 104, pulse rate, blood pressure, blood perfusion, respiratory rate, the presence of sweat or other moisture, and so forth. In other implementations, a camera may be used to acquire an image of at least a portion of the user 104, which may be used to determine skin characteristics, surface area, and so forth.

When an ultraviolet light source 126, such as the sun, emits light, shown as emitted light 128, toward a user 104 of the wearable device 102, the orientation of the wearable device 102 relative to the position of the ultraviolet light source 126 may affect the intensity of UV light detected by the UV light sensor 112. The gain level or other corrective factor determined for use with the UV light sensor 112 may also affect the intensity of UV light that is detected or used to generate an output 124. Based on the position of the ultraviolet light source 126 relative to the wearable device 102, the orientation of the wearable device 102 determined using the orientation sensor 116, and the corrective factor for use with the UV light sensor 112, a normalized intensity of the emitted light 128 may be determined. Based on the determined intensity, or an amount of radiant exposure that the user 104 is subjected to if the surface area of the user 104 is able to be determined, an output 124 based on the intensity or radiant exposure may be presented. As shown in FIG. 1, the output 124 may include information regarding the determined intensity of UV light, recommended times or lengths of time for exposure, and so forth.

Figure 2:
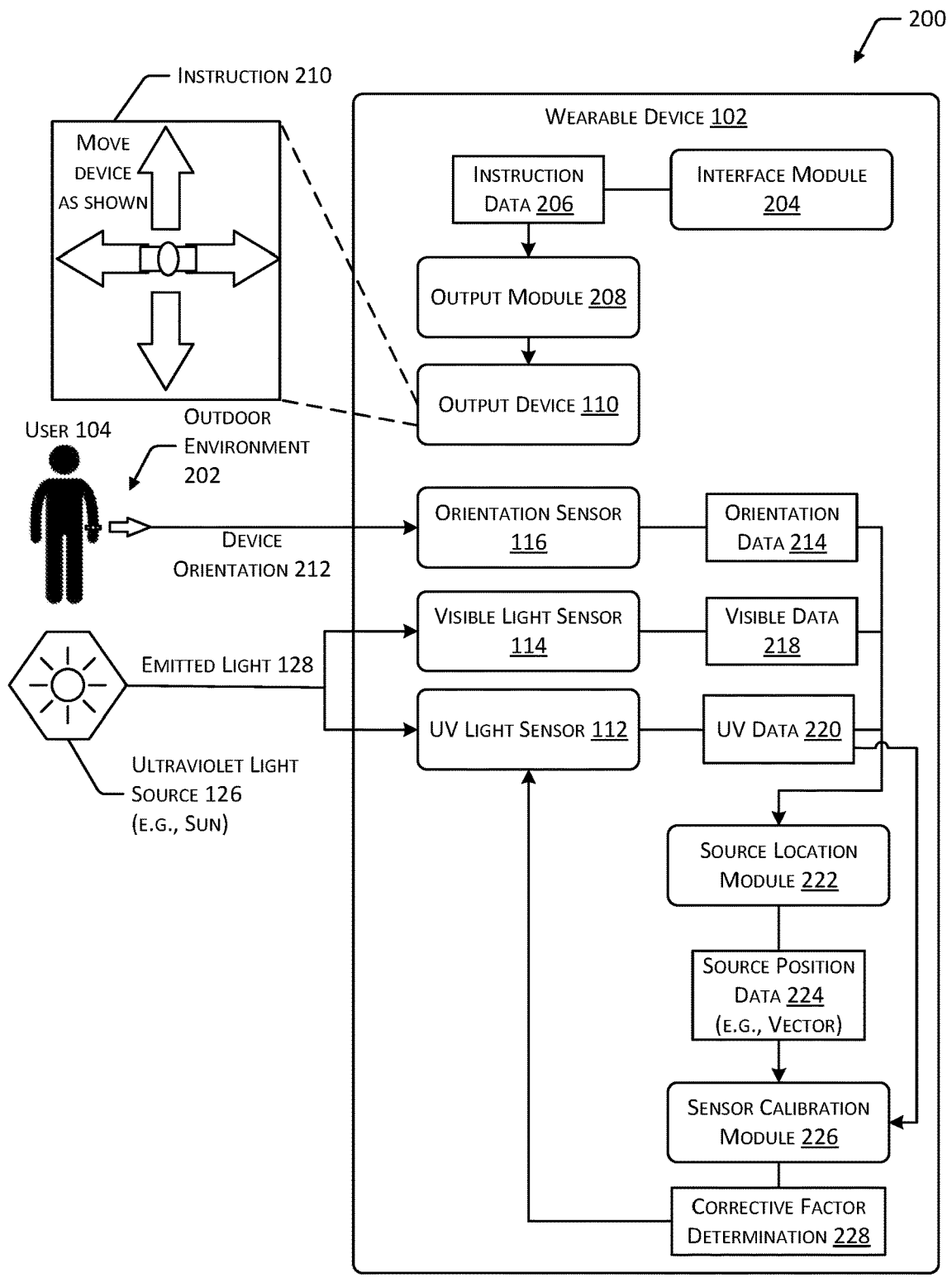
FIG. 2 is a block diagram depicting an implementation of components of a wearable device for calibrating an ultraviolet light sensor of the wearable device.

FIG. 2 is a block diagram 200 depicting an implementation of components of a wearable device 102 for calibrating an ultraviolet (UV) light sensor 112 of the wearable device 102. As described with regard to FIG. 1, a gain level or other type of configuration or corrective factor associated with the UV light sensor 112 may enable signals from the UV light sensor 112 that are indicative of detected UV light to be processed to enable accurate determination of detected ambient UV light. In some implementations, to determine the corrective factor for use with the UV light sensor 112, detected UV light and detected visible light, at a variety of determined orientations of the wearable device 102, may be used to determine a position of the sun or other ultraviolet light source 126 relative to the current location of the wearable device 102. For example, the position of the sun may be expressed as a vector value indicating a direction, angle, and distance (e.g., magnitude). In other implementations, the UV light sensor 112 may be placed at a position associated with a maximum (e.g., peak) intensity of UV light, and the determined maximum intensity may be used to determine the corrective factor for use with the UV light sensor 112. For example, as described with regard to FIG. 1, a Kalman filter may be used to determine an estimated current UV index for an environment associated with the wearable device 102.

To determine a gain level or other corrective factor for use with the UV light sensor 112, when the user 104 is in an outdoor environment 202, an interface module 204 associated with the wearable device 102 may provide instruction data 206 to an output module 208 to cause the output device 110 to present an instruction 210 based on the instruction data 206. The interface module 204 may be configured to present one or more user interfaces, receive user input associated with the user interface(s), and so forth. For example, when a user 104 executes an application associated with detection of UV light, an instruction 210 to move the wearable device 102 or position the wearable device 102 at one or more orientations may be presented. In other implementations, presentation of an instruction 210 may be omitted, and the wearable device 102 may automatically determine detected UV light and visible light at various orientations as the user 104 moves and performs activities.

Based on the device orientation 212 of the wearable device 102, the orientation sensor 116 may determine orientation data 214 indicative of the orientation of the wearable device 102. The orientation data 214 may indicate an angle of the orientation sensor 116 relative to vertical, relative to the Earth's surface, or relative to another reference value. The orientation data 214 may be used to determine the position of the ultraviolet light source 126, in combination with data from the UV light sensor 112 and visible light sensor 114, based on the intensity of detected light at various orientations of the wearable device 102. In other implementations, such as if a wearable device 102 lacks an orientation sensor 116, a maximum expected intensity of UV light, as described previously, may be used to determine one or more of a position of the ultraviolet light source 126 or a corrective factor for use with the UV light sensor 112.

Emitted light 128 from the ultraviolet light source 126 may be detected by the visible light sensor 114 and UV light sensor 112. The visible light sensor 114 may determine visible data 218 based on the intensity of the portion of the emitted light 128 having wavelengths associated with visible light. The amount of visible light that reaches the visible light sensor 114 may be affected by the orientation of the wearable device 102, which may include the angle at which the wearable device 102 is positioned as well as the direction that the wearable device 102 is positioned relative to the sun or other ultraviolet light source 126. The amount of visible light that reaches the visible light sensor 114 may also be affected by environmental conditions, such as clouds, weather, or other atmospheric conditions, the presence of natural or manmade structures that obstruct the sun, and so forth.

The UV light sensor 112 may determine UV data 220 based on the intensity of the portion of the emitted light 128 having wavelengths associated with UV light. The amount of UV light that reaches the UV light sensor 112 may be affected by the orientation of the wearable device 102, environmental conditions, the presence of objects that obstruct the sun, and so forth. In some implementations, the UV light sensor 112 may be configured to determine intensities of UV light having different wavelengths. For example, the UV data 220 may include an intensity of UV light having a wavelength ranging from 315 nm to 400 nm (UV-A), UV light having a wavelength ranging from 280 nm to 315 nm (UV-B), and UV light having a wavelength ranging from 100 nm to 280 nm (UV-C).

A source location module 222 associated with the wearable device 102 may determine source position data 224 indicative of the position of the ultraviolet light source 126 relative to the wearable device 102. For example, the source position data 224 may include a vector value indicative of the direction, angle, and in some implementations the distance, of the sun relative to the location of the wearable device 102. The source position data 224 may be determined based on one or more of the orientation data 214, visible data 218, or UV data 220. For example, during a period of time, as the wearable device 102 is positioned in a variety of orientations, visible data 218 and UV data 220 may be determined. The intensity of light at different orientations of the wearable device 102 may be used to determine the position of the ultraviolet light source 126 relative to the wearable device 102. In some implementations, data associated with the current location of the wearable device 102 may also be used to determine the source position data 224. For example, data indicative of the current location of the wearable device 102 may be provided to one or more computing devices external to the wearable device 102, such as computing devices associated with environmental entities, weather-related entities, governmental entities, or other types of entities, and the wearable device 102 may receive data associated with the current location from the computing device(s). The received data may include current weather information, atmospheric conditions, information regarding UV light, and so forth. In some implementations, the received data may include almanac data, such as data indicative of the expected position of the sun. In some implementations, if the source position data 224 differs from the almanac data by more than a threshold amount, the process for determining a gain level for the UV light sensor 112 described with regard to FIG. 2 may be repeated.

A sensor calibration module 226 associated with the wearable device 102 may determine a corrective factor determination 228 for the UV light sensor 112 based at least in part on the source position data 224 and the UV data 220. In some implementations, the corrective factor determination 228 may include a gain level for the UV light sensor 112. For example, based on the position of the sun or other ultraviolet light source 126 relative to the wearable device 102, and based on the current intensity of detected UV light represented by the UV data 220, the sensitivity of the UV light sensor 112 may be adjusted such that a signal representing detected UV light is expected to remain within a threshold range. For example, if the wearable device 102 is in an orientation that reduces the amount of UV light that reaches the UV light sensor 112, or if low light is currently present in the ambient environment, the corrective factor determination 228 may provide the UV light sensor 112 with a high gain level to cause signals from the UV light sensor 112 to be above a threshold minimum value. If the orientation of the wearable device 102 or amount of UV light in the ambient environment causes a high intensity of UV light to be detected by the UV light sensor 112, the corrective factor determination 228 may provide the UV light sensor 112 with a low gain level to cause signals from the UV light sensor 112 to be below a threshold maximum value. At a subsequent time, the UV light sensor 112, configured using the corrective factor determination 228, may be used to detect the intensity of ambient UV light at the location of the wearable device 102. In other implementations, the corrective factor determination 228 may indicate other types of corrective factors, such as post-processing modifiers applied to signals determined using the UV light sensor 112.

Figure 3:
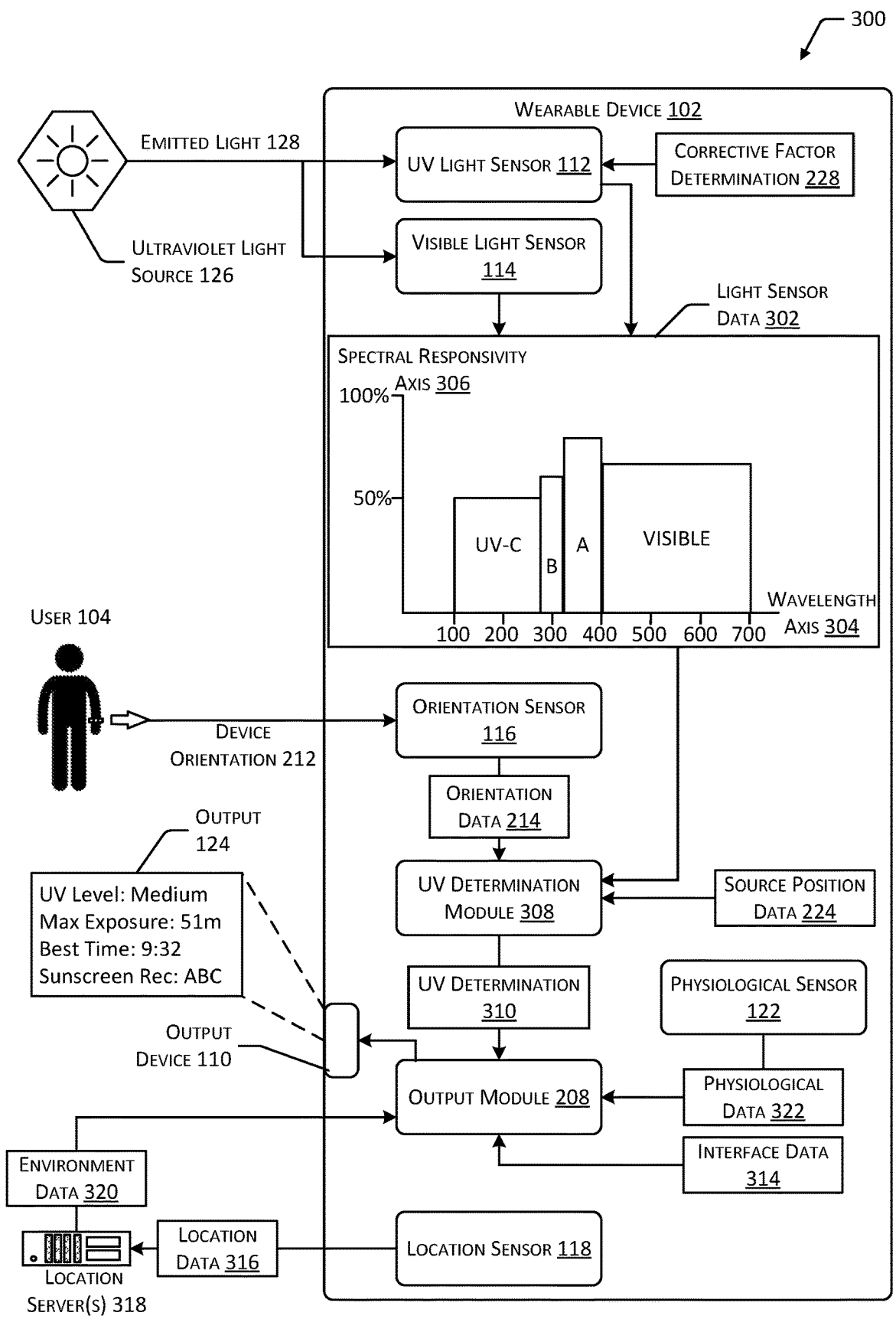
FIG. 3 is a block diagram depicting an implementation of components of a wearable device for detecting ultraviolet light at a location and presenting an output based on data from one or more sensors.

FIG. 3 is a block diagram 300 depicting an implementation of components of a wearable device 102 for detecting ultraviolet light at a location and presenting an output based on data from one or more sensors. As described with regard to FIGS. 1 and 2, after a corrective factor determination 228 has been used to configure the UV light sensor 112, during a subsequent time period, emitted light 128 from an ultraviolet light source 126 may reach the UV light sensor 112 and visible light sensor 114 of the wearable device 102. In some implementations, the ultraviolet light source 126 may include the sun. However, other natural and artificial sources of ultraviolet light may also exist. For example, various surfaces may reflect ultraviolet light from the sun toward the wearable device 102 and may function as an ultraviolet light source 126. As another example, the ultraviolet light source 126 may include one or more artificial light sources such as ultraviolet lights used for various cosmetic and health purposes. In some cases, multiple ultraviolet light sources 126 may emit light toward the wearable device 102, and the source position data 224 may indicate multiple sources.

The UV light sensor 112 and visible light sensor 114 may determine light sensor data 302 indicative of emitted light 128 detected by the sensors. For example, the light sensor data 302 may include the visible data 218 and UV data 220, as described with regard to FIG. 2. The light sensor data 302 may include an indication of the intensity (or radiant exposure based on the surface area of the UV light sensor 112 and visible light sensor 114) of detected light in various bandwidths. For example, light sensor data 302 may include visible data 218 and UV data 220, as described with regard to FIG. 2. In the example shown in FIG. 3, the light sensor data 302 is represented as a graph in which the wavelength of detected light is represented on a wavelength axis 304, while the intensity of detected light for each wavelength is represented on a spectral responsivity axis 306. Continuing the example, FIG. 3, depicts a first determined intensity for UV-C light having a bandwidth of approximately 100 nm to 280 nm, a second intensity for UV-B light having a bandwidth of approximately 280 nm to 315 nm, a third determined intensity for UV-A light having a bandwidth ranging from 315 nm to 400 nm, and a fourth determined intensity for visible light having a bandwidth of 400 nm to 700 nm.

In some implementations, the orientation sensor 116 may determine orientation data 214 indicative of the device orientation 212 of the wearable device 102. For example, the direction in which the wearable device 102 is positioned relative to the ultraviolet light source 126, and the angle of inclination at which the wearable device 102 is positioned relative to the ultraviolet light source 126 may affect the intensities of different bandwidths of light received by the UV light sensor 112 and visible light sensor 114, indicated in the light sensor data 302. Continuing the example, an orientation of the wearable device 102 associated with a direction or inclement angle that receives less emitted light 128 from the ultraviolet light source 126 may result in the light sensor data 302 indicating an intensity that is less than the actual amount of light present in the location of the wearable device 102, while an orientation associated with a direction or inclement angle that receives significant emitted light 128 may result in the light sensor data 302 indicating an intensity that is greater than or equal to the actual amount of light present in the location of the wearable device 102. In other implementations, a previously-determined maximal (e.g., peak) value associated with the UV light sensor 112 may be used in addition to or in place of orientation data 214 to determine the actual intensity of light at the location of the wearable device 102. For example, as described with regard to FIG. 1, a Kalman filter may use a previous maximal value from the UV light sensor 112, a corrective factor, and current signals from one or more sensors to determine an estimated intensity of UV light in an environment associated with the wearable device 102.

A UV determination module 308 associated with the wearable device 102 may generate a UV determination 310 indicative of the intensity of UV light at the location of the wearable device 102. In some cases, the UV determination 310 may be determined by normalizing the intensities of UV light indicated in the light sensor data 302, such as by accounting for one or more of the gain level associated with the UV light sensor 112, other corrective factors to be applied to the signal from the UV light sensor 112, or the position of the sun or other ultraviolet light source 126 relative to the wearable device 102. For example, as the user 104 moves and performs various activities, based on the device orientation 212 of the wearable device 102 and various environmental conditions associated with the location of the wearable device 102, at least a portion of emitted light 128 may reach the UV light sensor 112 and visible light sensor 114.

The output module 208 may determine an output 124 based at least in part on the UV determination 310. For example, output 124 based on the UV determination 310 may include an indication of an intensity of UV light. In some implementations, the output module 208 may access interface data 314, which may associate lengths of exposure or times of exposure with an intensity of UV light indicated in the UV determination 310, or with the position of the ultraviolet light source 126 indicated in the source position data 224. For example, the output 124 may present recommended lengths of time for exposure to the sun or other ultraviolet light source 126, optimal times of day for such exposure, recommendations regarding types or timing of sunscreen or other protective measures, and so forth. In some implementations, the output 124 may also be determined based in part on data associated with the location of the wearable device 102. For example, the location sensor 118 may determine location data 316 indicative of the location of the wearable device 102, which may be provided to one or more location servers 318. The location server(s) 318 may include one or more computing devices associated with environmental or governmental agencies that maintain information regarding the position of the sun, atmospheric conditions, and so forth. Environment data 320 indicative of an expected intensity of UV light at the location of the wearable device 102, an expected position of the sun at the location of the wearable device 102, or both an expected intensity of UV light and expected position of the sun, may be received from the location server(s) 318. As a result, the output 124 presented may be customized to the current location of the user 104. In some implementations, the information included in the output 124 may be based in part on the intensity of UV light or position of the sun indicated in the environment data 320. Additionally, in some implementations, if the determined position of the sun indicated in the source position data 224 differs from the expected position of the sun indicated in the environment data 320 by more than a threshold value, this may indicate a potential error associated with the calibration of the UV light sensor 112. In such a case, the process for determining the corrective factor for use with the UV light sensor 112, described with regard to FIG. 2, may be repeated.

In some implementations, the output module 208 may determine the output 124 based at least in part on physiological data 322 from the physiological sensor 122. For example, the physiological sensor 122 may include a PPG sensor that emits light toward the skin of the user 104 and determines portions of the emitted light that are absorbed or reflected. In some implementations, the PPG sensor may be operated to cause generally continuous emission of light toward the skin of the user 104 to enable reflectivity of the skin to be determined. Physiological data 322 from a PPG sensor may be used to determine amounts of fat, fluid, hair, pigment, or other components of the skin of the user 104 that may affect absorption or reflection of UV light from the sun or other UV light source 126. As other examples, the physiological sensor 122 may include a temperature sensor, a moisture sensor, sensors that measure blood pressure, pulse rate, respiratory rate, blood perfusion, or other types of sensors may be used to acquire physiological data 322, which may in part be used to determine the output 124 that is presented. For example, a user 104 having a high body temperature, blood pressure, or pulse rate may be presented with a lower maximum length of time for exposure to the sun than a user 104 lacking such physiological data 322. Additionally, in some cases, user input indicative of a height, weight, or other information regarding the user 104 may be received and used to determine a surface area of the user 104 exposed to the ultraviolet light source 126. The output 124 presented may therefore be customized based on physiological data 322 associated with the user 104. For example, an output 124 presented to a first user 104 may differ from outputs presented to other users that are not associated with similar physiological data 322.

Figure 4:
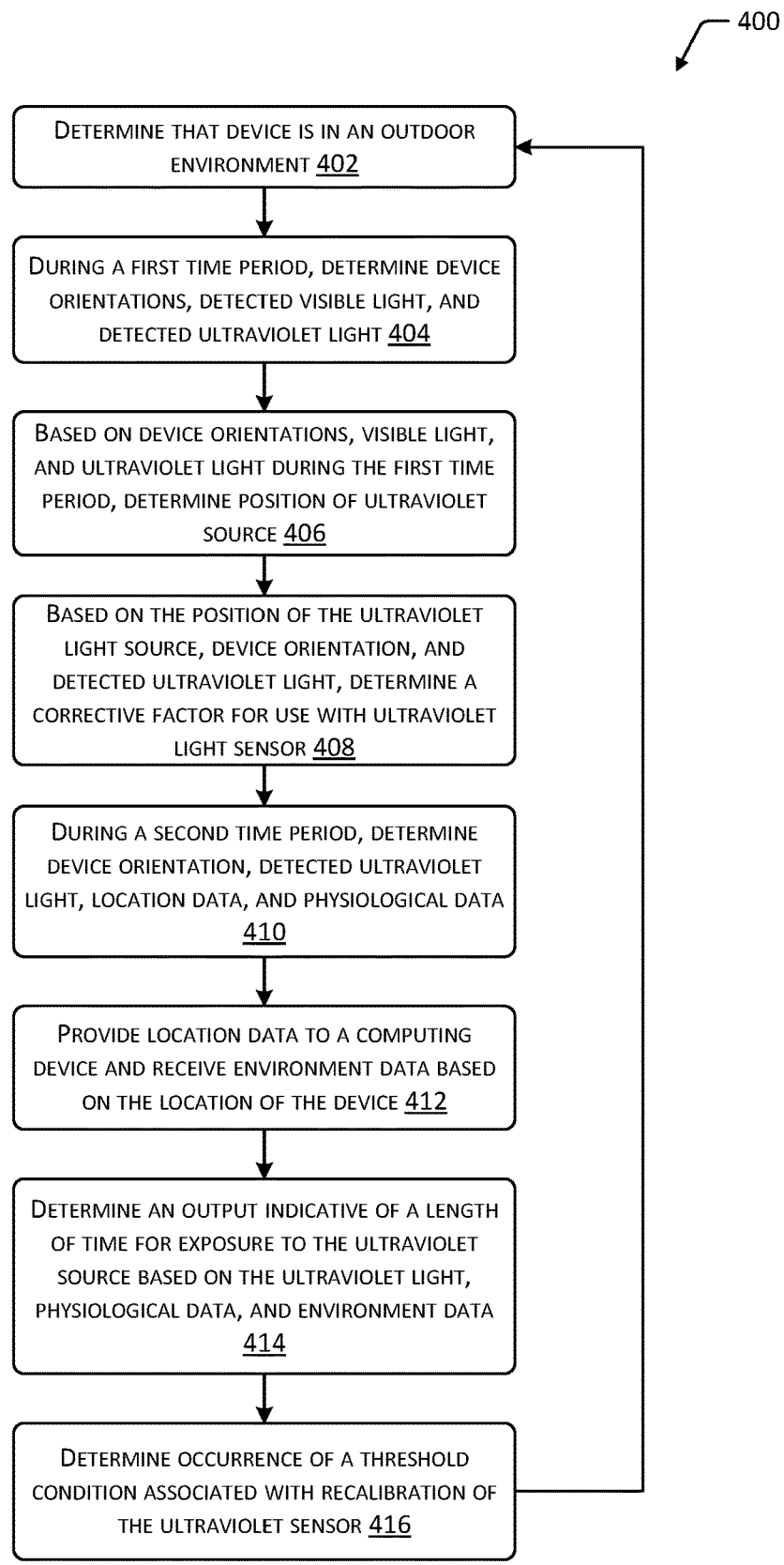
FIG. 4 is a flow diagram depicting an implementation of a process for calibrating an ultraviolet light sensor of a wearable device and detecting ultraviolet light at a location using the wearable device.

FIG. 4 is a flow diagram 400 depicting an implementation of a process for calibrating an ultraviolet light sensor 112 of a wearable device 102 and detecting ultraviolet light at a location using the wearable device 102. At 402, a determination may be made that the wearable device 102 is in an outdoor environment 202. For example, when the wearable device 102 is in an indoor environment, the intensity of ambient UV light at the location of the wearable device 102 is likely to be small, and recommendations associated with exposure to UV light may lack relevance to a user 104 of the wearable device 102. Determining that the wearable device 102 is in an outdoor environment before performing other portions of the process shown in FIG. 4 may therefore avoid acquisition and presentation of information that may not be relevant, use of power and computational resources to perform these functions, and so forth. In some implementations, a determination may be made that the wearable device 102 is in an outdoor environment 202 based on data acquired using one or more of the UV light sensor 112 or the visible light sensor 114. For example, an intensity of light greater than a threshold value may indicate that the wearable device 102 is in an outdoor environment 202. In some cases, the threshold value may be determined based on a time of day, a time of year, a current location of the wearable device 102, and so forth. In other implementations, a determination may be made using other environmental conditions detected using one or more environmental sensors 120, such as temperature, humidity, air pressure, air quality, the presence or absence of wind or precipitation, and so forth. In still other implementations, a determination may be made using one or more physiological sensors 122. For example, if a physiological sensor 122 indicates that a user 104 is sweating or the body temperature of the user 104 has increased, this may be indicative of an outdoor environment 202. In other implementations, the process described with regard to FIG. 4 may be performed without determining that the wearable device 102 is in an outdoor environment 202, and the step shown at 402 may be omitted.

At 404, during a first time period, device orientations 212 of the wearable device 102, detected UV light by the UV light sensor 112, and detected visible light by the visible light sensor 114 may be determined. In some implementations, an instruction 210 may be presented requesting the user 104 to move the wearable device 102 in particular directions, to particular positions, or to particular orientations, while data indicative of detected visible light and UV light is acquired. In other implementations, data indicative of device orientations 212 and detected light may be acquired automatically during a period of time, while the user 104 moves and performs various activities. In some cases, the UV light sensor 112 of the wearable device 102 may initially be calibrated by presenting an instruction 210 and acquiring data from the orientation sensor 116, UV light sensor 112, and visible light sensor 114 while the wearable device 102 is moved to selected positions and orientations. At future times the UV light sensor 112 may automatically acquire such data as the user 104 moves and positions the wearable device 102 in various orientations during performance of activities. In other implementations, use of an orientation sensor 116 may be omitted. For example, an instruction 210 may be presented requesting the user 104 to position the wearable device 102 at a location that faces the sun or other ultraviolet light source 126. A maximal (e.g., peak) value may then be determined using the UV light sensor 112, and corrective factors associated with subsequent measurements may be based on the maximal value and values determined using other sensors. For example, if a signal from the UV light sensor 112 changes while a signal from the visible light sensor 114 remains constant, this may indicate that the intensity of UV light in the ambient environment has not changed independent of the signal from the UV light sensor 112.

At 406, based on the device orientations 212, if acquired, detected visible light, and detected ultraviolet light during the first time period, the position of an ultraviolet light source 126 may be determined. For example, the position of an ultraviolet light source 126 may be represented by a vector value indicative of the direction, angle, and in some implementations the distance of the ultraviolet light source 126 relative to the location of the wearable device 102. For example, for each orientation of the wearable device 102 during a period of time, data indicative of the intensity of visible light and UV light may be determined. In some implementations, data associated with the current location of the wearable device 102 may also be used to determine position of the ultraviolet light source 126. For example, location data 316 may be provided to one or more location servers 318 to determine almanac data, such as data indicative of the expected position of the sun, for a current location at a current date and time.

At 408, based on the position of the ultraviolet light source 126, the device orientation 212, if acquired, and the intensity of the detected ultraviolet light, a corrective factor for use with a UV light sensor 112 may be determined. As one example, based on the position of the sun or other ultraviolet light source 126 relative to the UV light sensor 112, and based on the current intensity of detected UV light, the sensitivity (e.g., gain level) of the UV light sensor 112 may be adjusted such that a signal representing detected UV light is within a threshold range. For example, if the wearable device 102 is in an orientation that reduces the amount of UV light that reaches the UV light sensor 112, or if only a low intensity of UV light is currently present in the ambient environment, the UV light sensor 112 may be provided with a high gain level to cause signals from the UV light sensor 112 to be above a threshold minimum value. If the orientation of the wearable device 102 or intensity of UV light in the ambient environment causes a high intensity of UV light to be detected by the UV light sensor 112, the UV light sensor 112 may be provided with a low gain level to cause signals from the UV light sensor 112 to be below a threshold maximum value. In other implementations, a corrective factor may be applied to an acquired signal to cause the corrected signal value to be greater than a threshold minimum value and less than at threshold maximum value.

At 410, during a second time period, the device orientation 212 of the wearable device 102, if acquired, an intensity of detected UV light, location data 316 indicative of a location of the wearable device 102, and physiological data 322 may be determined. For example, an orientation sensor 116 of the wearable device 102 may determine orientation data 214 indicative of a current angle of the orientation sensor 116 relative to vertical, the Earth's surface, or another reference value. A UV light sensor 112 may determine a spectral responsivity value for detected UV light in one or more bandwidths, such as bandwidths corresponding to UV-A, UV-B, and UV-C light. A location sensor 118 may determine location data 316 indicative of a current position of the location sensor 118 relative to one or more reference points on the Earth's surface. For example, the location data 316 may indicate a coordinate position, such as longitude and latitude coordinates, and in some cases elevation above sea level or another reference value. A physiological sensor 122 may determine one or more physiological characteristics of a user 104, such as portions of emitted light that are absorbed or reflected by the skin of the user 104.

At 412, the location data 316 may be provided to a computing device, such as one or more location servers 318 associated with an entity that maintains data on one or more locations, and environment data 320 that corresponds to the location indicated in the location data 316 may be received. Environment data 320 may indicate an expected intensity of UV light at the location of the location sensor 118, an expected position of the sun at the location, and so forth.

At 414, an output 124 indicative of a length of time for exposure to the ultraviolet light source 126 may be determined, based on the detected UV light, the physiological data 322, and the environment data 320. For example, a UV determination 310 indicative of an actual intensity of UV light at the location of the wearable device 102 may be determined by accounting for the gain level of the UV light sensor 112 and the current orientation of the wearable device 102 relative to the position of the sun or other ultraviolet light source 126. Continuing the example, a length of time that is suitable for exposure to the sun may be inversely proportional to the intensity of UV-B light as determined by the detected UV light and the environment data 320, but may increase based on the portion of light emitted by a PPG sensor that is reflected by the skin of the user 104.

At 416, occurrence of a threshold condition associated with recalibration of the ultraviolet light sensor 112 may be determined, and at least the portion of the process shown at 402 through 408 of FIG. 4 may be repeated to determine a subsequent gain level for the ultraviolet light sensor 112. A threshold condition may include an intensity of UV light that causes a signal from the UV light sensor 112 to be below a threshold minimum value or above a threshold maximum value. As another example, a threshold condition may include the passage of a threshold length of time since the previous gain level for the UV light sensor 112 was determined. As yet another example, a threshold condition may include movement of the wearable device 102, determined using the location sensor 118, or an accelerometer or motion sensor, more than a threshold distance from a previous location of the wearable device 102. A threshold condition may also occur based on user input.

Figure 5:
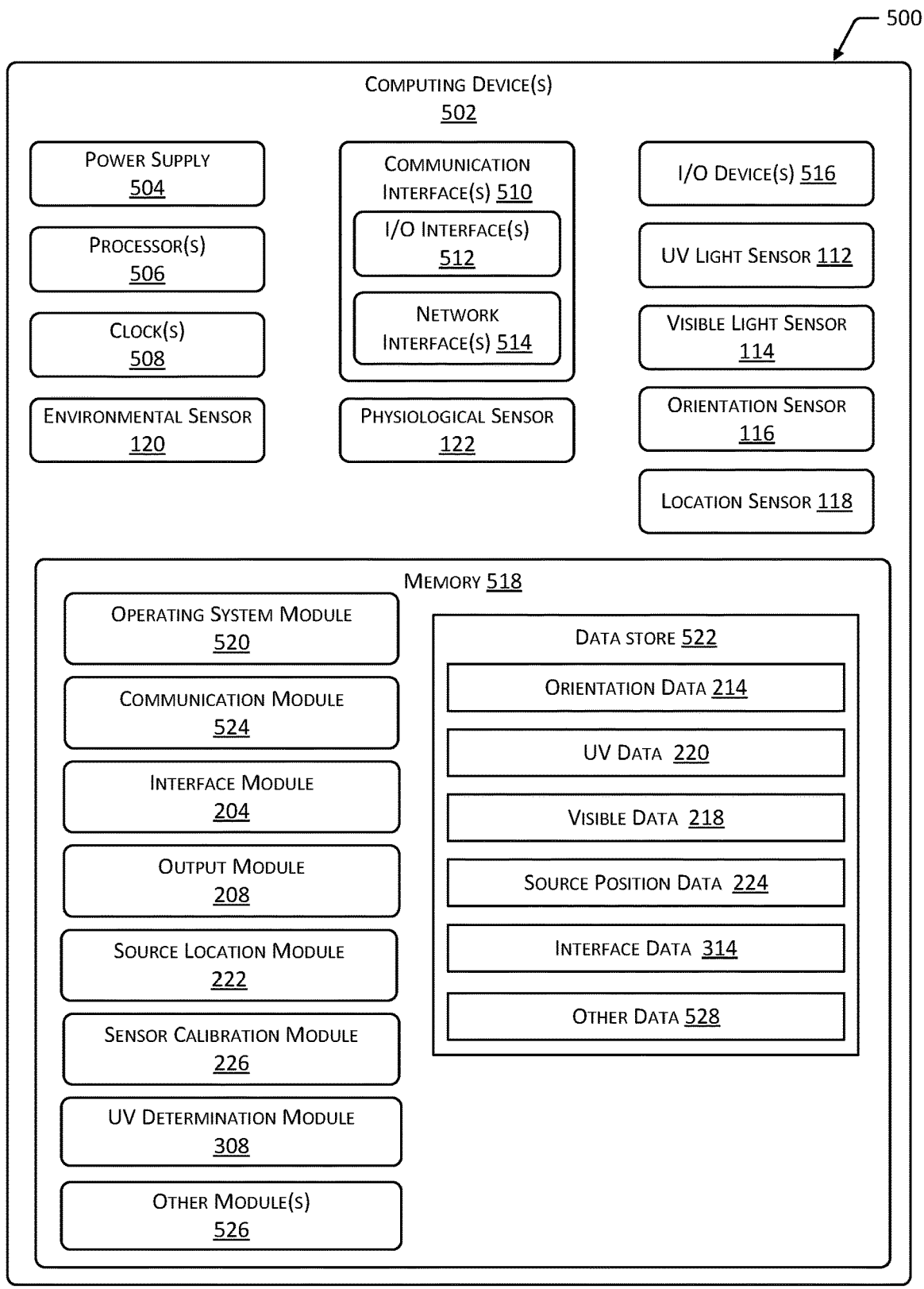
FIG. 5 is a block diagram depicting an implementation of a computing device within the present disclosure.

FIG. 5 is a block diagram 500 depicting an implementation of a computing device 502 within the present disclosure. The computing device 502 may include a wearable device 102, as described with regard to FIGS. 1-4. However, in other implementations, a wearable device 102 may exchange data with one or more servers or other computing devices 502, which may perform one or more of the functions described with regard to the wearable device 102. For example, a wearable device 102 may send data acquired using one or more sensors to an external computing device 502, which may determine an output 124 and provide the output 124 to the wearable device 102 for presentation. In other cases, the wearable device 102 may perform a first portion of the functions described herein, while one or more other computing devices 502 may perform a second portion of the functions. As such, while FIG. 5 depicts a single block diagram 500, the depicted computing device 502 may include any number of computing devices of similar or different types.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. The computing device 502 may also include one or more types of sensors including, without limitation, one or more UV light sensors 112, visible light sensors 114, orientation sensors 116, location sensors 118, environmental sensors 120, or physiological sensors 122. In some implementations, the I/O devices 516 and sensors may be physically incorporated with the computing device 502. In other implementations, I/O devices 516 and sensors may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, 6G, LTE, and so forth.

The computing device 502 may include one or more buses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices, network attached storage devices, and so forth.

A communication module 524 may be configured to establish communications with one or more other computing devices 502. Communications may be authenticated, encrypted, and so forth.

The memory 518 may also store the interface module 204. The interface module 204 may present various user interfaces and receive user input via the user interfaces. For example, an interface module 204 may generate data indicative of an instruction 210 to request a user 104 to move a wearable device 102 in one or more positions or orientations, such as when calibrating a UV light sensor 112.

The memory 518 may additionally store the output module 208. The output module 208 may cause presentation of instructions 210 and output 124 based on data received from the interface module 204, the UV determination module 308, one or more sensors, and so forth. For example, the output module 208 may determine output 124 based at least in part on a determined intensity of UV light in a location, interface data 314 that associates lengths of exposure or times of exposure with an intensity of UV light, data associated with a location where the UV light is detected, physiological data 322 associated with a user 104, and so forth.

The memory 518 may store the source location module 222. The source location module 222 may determine source position data 224 indicative of a position of an ultraviolet light source 126 relative to one or more sensors. For example, the source position data 224 may include a vector value indicative of a direction, an angle, and in some cases a distance of an ultraviolet light source 126 relative to the location of the sensor(s). Continuing the example, for one or more determined orientations of an orientation sensor 116, visible data 218 and UV data 220 indicative of detected light may be determined. The intensity of light associated with different orientations determine the position of the ultraviolet light source 126 relative to the sensors. In some implementations, data associated with a determined location may also be used to determine the source position data 224. For example, location-specific data may be received from devices associated with environmental entities, weather-related entities, governmental entities, or other types of entities. In some implementations, the received data may include almanac data, such as data indicative of the expected position of the sun, data indicative of expected UV light intensity or weather conditions, and so forth.

The memory 518 may also store the sensor calibration module 226. The sensor calibration module 226 may determine a corrective factor determination 228 for a UV light sensor 112 based at least in part on source position data 224 and UV data 220 indicative of an intensity of detect UV light. The gain level of the UV light sensor 112 may be selected such that a signal representing detected UV light remains within a threshold range.

The memory 518 may additionally store the UV determination module 308. The UV determination module 308 may generate a UV determination 310 indicative of the intensity of UV light detected by the UV light sensor 112. For example, the UV determination 310 may be determined by normalizing the intensities of detected UV light, such as by accounting for one or more of the gain level associated with the UV light sensor 112 or the position of the sun or other ultraviolet light source 126.

Other modules 526 may also be present in the memory 518. For example, other modules 526 may include permission or authorization modules for acquiring location data 316, physiological data 322, or other types of data associated with a user 104 or with a location, for modifying configurations or settings of computing devices 502, and so forth. Other modules 526 may also include encryption modules to encrypt and decrypt communications between computing devices 502, authentication modules to authenticate communications sent or received by computing devices 502, and so forth.

Other data 528 within the data store(s) 522 may include configurations, settings, preferences, and default values associated with computing devices 502. Other data 528 may also include encryption keys and schema, access credentials, and so forth. Other data 528 may additionally include authorization data indicative of user accounts that have provided authorization for acquisition of location data 316, physiological data 322, or other types of data.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solidstate memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
an ultraviolet light sensor;
a visible light sensor;
a location sensor;
an orientation sensor;
an output device;
one or more non-transitory memories storing computer-executable instructions; and
one or more hardware processors to execute the computer-executable instructions to:
during a first time period:
present, using the output device, an instruction to position the device at one or more positions;
determine, for a first position of the device, first ultraviolet data indicative of ultraviolet light detected by the ultraviolet light sensor;
determine, for the first position of the device, first visible data indicative of visible light detected by the visible light sensor;
determine, for the first position of the device, first orientation data indicative of a first orientation relative to vertical using the orientation sensor;
determine, for a second position of the device, second ultraviolet data indicative of ultraviolet light detected by the ultraviolet light sensor;
determine, for the second position of the device, second visible data indicative of visible light detected by the visible light sensor;
determine, for the second position of the device, second orientation data indicative of a second orientation relative to vertical using the orientation sensor;
based on the first ultraviolet data, the first visible data, the first orientation data, the second ultraviolet data, the second visible data, and the second orientation data, determine a first position of an ultraviolet source relative to the device;
based on the first ultraviolet data, the second ultraviolet data, and the first position of the ultraviolet source, determine a first gain level for the ultraviolet light sensor;
during a second time period after the first time period:
determine location data indicative of a location of the device determined by the location sensor;
provide data indicative of the location to a computing device associated with data indicative of the ultraviolet source;
receive, from the computing device, third ultraviolet data indicative of a first intensity of ultraviolet light associated with the location;
determine, using the ultraviolet light sensor and the first gain level, fourth ultraviolet data indicative of a second intensity of ultraviolet light associated with the location;
based on the third ultraviolet data and the fourth ultraviolet data, determine output data indicative of a recommended length of time associated with exposure to light from the ultraviolet source; and
present output based on the output data using the output device.

2. The device of claim 1, further comprising computer-executable instructions to:
during the second time period:
determine third visible data indicative of an intensity of visible light associated with the location; and
determine that the intensity of visible light is greater than or equal to a threshold intensity of visible light associated with outdoor environments;
wherein the fourth ultraviolet data is determined in response to the intensity of visible light being greater than or equal to the threshold intensity of visible light.

3. The device of claim 1, wherein during a third time period after the first time period, the device is in a third position, the device further comprising computer-executable instructions to:
during the third time period:
determine, for the third position of the device, fifth ultraviolet data indicative of ultraviolet light detected by the ultraviolet light sensor;
determine, for the third position of the device, third visible data indicative of visible light detected by the visible light sensor;
determine, for the third position of the device, third orientation data indicative of a third orientation relative to vertical using the orientation sensor;
based on the fifth ultraviolet data, the third visible data, and the third orientation data, determine a second position of the ultraviolet source relative to the device; and
based on the fifth ultraviolet data and the second position of the ultraviolet source, determine a second gain level for the ultraviolet light sensor.

4. A device comprising:
an ultraviolet light sensor;
an orientation sensor;
one or more non-transitory memories storing computer-executable instructions; and
one or more hardware processors to execute the computer-executable instructions to:
during a first time period:
determine, for one or more first positions of the device, first ultraviolet data indicative of ultraviolet light detected by the ultraviolet light sensor;

determine, based on the first ultraviolet data, a first maximum value indicative of a maximum intensity of ultraviolet light for the one or more first positions;

determine, based on the first maximum value, a first position of an ultraviolet source relative to the device;

determine, based on the first ultraviolet data and the first position of the ultraviolet source, a first corrective factor for modifying data determined using the ultraviolet light sensor;

during a second time period after the first time period:

determine, using the ultraviolet light sensor and the first corrective factor, second ultraviolet data indicative of a first intensity of ultraviolet light associated with a location of the device; and determine output data based at least in part on the second ultraviolet data.

5. The device of claim 4, further comprising computer-executable instructions to:

determine that the first intensity of ultraviolet light is greater than or equal to a threshold value associated with an outdoor environment;

wherein the output data is determined in response to the first intensity of ultraviolet light being greater than or equal to the threshold value.

6. The device of claim 4, further comprising:

a visible light sensor; and computer-executable instructions to:

during the second time period:

determine visible data indicative of an intensity of visible light detected by the visible light sensor; and determine that the intensity of visible light is greater than or equal to a threshold value associated with an outdoor environment;

wherein the second ultraviolet data is determined in response to the intensity of visible light being greater than or equal to the threshold value.

7. The device of claim 4, further comprising:

a visible light sensor; and computer-executable instructions to:

during the first time period:

determine for the one or more first positions of the device, first visible data indicative of visible light detected by the visible light sensor;

wherein the first position of the ultraviolet source is further determined based on the first visible data.

8. The device of claim 4, further comprising computer-executable instructions to:

during the first time period:

before determining the first ultraviolet data, present an instruction to position the device in at least one of the one or more first positions.

9. The device of claim 4, further comprising computer-executable instructions to:

determine, for the one or more first positions of the device, first orientation data indicative of a first orientation of the device;

wherein the first position of the ultraviolet source relative to the device is further determined based on the first orientation data.

10. The device of claim 4, further comprising:

a photoplethysmograph (PPG) sensor;

a retention mechanism to hold the PPG sensor proximate to a user of the device; and computer-executable instructions to:

determine, using the PPG sensor, PPG data indicative of light that is one or more of absorbed or reflected by skin of the user of the device, wherein the PPG data is associated with a skin characteristic of the user of the device;

determine, based on the PPG data and the second ultraviolet data, a recommended length of time associated with exposure to the ultraviolet source; and include an indication of the recommended length of time in the output data.

11. The device of claim 4, further comprising:

a location sensor; and computer-executable instructions to:

during the second time period:

determine, using the location sensor, location data indicative of the location of the device;

provide data indicative of the location to a computing device associated with data indicative of the ultraviolet source; and receive, from the computing device, third ultraviolet data indicative of a second intensity of ultraviolet light associated with the location;

wherein the output data is further determined based on the third ultraviolet data.

12. The device of claim 4, further comprising:

a location sensor; and computer-executable instructions to:

during a third time period after the first time period:

determine, using the location sensor, location data indicative of the location of the device;

provide data indicative of the location to a computing device associated with data indicative of the ultraviolet source;

receive, from the computing device, third ultraviolet data indicative of a second intensity of ultraviolet light associated with the location;

determine that a difference between the second intensity of ultraviolet light and the first intensity of ultraviolet light exceeds a threshold difference;

in response to the difference exceeding the threshold difference, determine, for one or more second positions of the device, fourth ultraviolet data indicative of ultraviolet light detected by the ultraviolet light sensor;

determine, based on the fourth ultraviolet data, a second maximum value indicative of a maximum intensity of ultraviolet light for the one or more second positions;

determine, based on the second maximum value, a second position of the ultraviolet source relative to the device; and determine, based on the fourth ultraviolet data and the second position of the ultraviolet source, a second corrective factor associated with the ultraviolet light sensor.

13. The device of claim 4, further comprising computer-executable instructions to:

receive input indicative of one or more of a height or a weight of a user of the device;

determine a surface area of the user based on the one or more of the height or the weight;

determine, based on the surface area and the second ultraviolet data, a recommended length of time associated with exposure to light from the ultraviolet source; and include an indication of the recommended length of time in the output data.

14. A device comprising:

an ultraviolet light sensor;

an orientation sensor;
one or more non-transitory memories storing computer-executable instructions; and
one or more hardware processors to execute the computer-executable instructions to:
during a first time period:
determine first ultraviolet data indicative of ultraviolet light detected by the ultraviolet light sensor;
determine, based on the first ultraviolet data, a first maximum value indicative of a maximum intensity of ultraviolet light;
determine, based on the first ultraviolet data and the first maximum value, a first corrective factor for use with data determined using the ultraviolet light sensor;
during a second time period after the first time period:
determine, using the ultraviolet light sensor and the first corrective factor, second ultraviolet data indicative of ultraviolet light detected by the ultraviolet light sensor; and
determine output data based at least in part on the second ultraviolet data.

15. The device of claim 14, wherein the second ultraviolet data is indicative of:
a first intensity of first ultraviolet light having a first range of wavelengths;
a second intensity of second ultraviolet light having a second range of wavelengths that differs from the first range of wavelengths; and
a third intensity of third ultraviolet light having a third range of wavelengths that differs from the first range of wavelengths and the second range of wavelengths;
wherein the output data is based on:
at least one of the first intensity, the second intensity, or the third intensity; and
threshold data indicative of a length of exposure associated with one or more of the first range of wavelengths, the second range of wavelengths, or the third range of wavelengths.

16. The device of claim 14, further comprising:
a physiological sensor; and
computer-executable instructions to:
determine a physiological characteristic of a user of the device based on data from the physiological sensor; and
determine a length of exposure based on the second ultraviolet data and the physiological characteristic;
wherein the output data is indicative of the length of exposure.

17. The device of claim 16, wherein the physiological sensor includes a photoplethysmograph (PPG) sensor, and the computer-executable instructions to determine the physiological characteristic include computer-executable instructions to determine a characteristic of light associated with the PPG sensor that is one or more of absorbed or reflected by skin of the user.

18. The device of claim 14, further comprising:
an environmental sensor; and
computer-executable instructions to:
determine data indicative of an environmental condition from the environmental sensor; and
determine correspondence between the data indicative of the environmental condition and threshold data indicative of conditions associated with an outdoor environment;
wherein the second ultraviolet data is determined in response to the correspondence between the data indicative of the environmental condition and the threshold data.

19. The device of claim 18, wherein the environmental sensor includes a visible light sensor, and the data indicative of the environmental condition includes an intensity of visible light greater than a threshold intensity of visible light associated with the outdoor environment.

20. The device of claim 18, wherein the environmental sensor includes one or more of a temperature sensor or a pressure sensor, and the data indicative of the environmental condition includes one or more of:
a temperature that corresponds to a threshold temperature associated with the outdoor environment; or
a pressure that corresponds to a threshold pressure associated with the outdoor environment.

* * * * *